United States Patent
Watanabe

(10) Patent No.: US 8,324,991 B2
(45) Date of Patent: Dec. 4, 2012

(54) ELECTROLYTIC CORROSION PREVENTION STRUCTURE AND WAVEGUIDE CONNECTION STRUCTURE

(75) Inventor: Naotsugu Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 12/746,590

(22) PCT Filed: Nov. 27, 2008

(86) PCT No.: PCT/JP2008/071586
§ 371 (c)(1),
(2), (4) Date: Jun. 7, 2010

(87) PCT Pub. No.: WO2009/075192
PCT Pub. Date: Jun. 18, 2009

(65) Prior Publication Data
US 2010/0253451 A1 Oct. 7, 2010

(30) Foreign Application Priority Data
Dec. 12, 2007 (JP) ................................. 2007-321335

(51) Int. Cl.
*H01P 1/04* (2006.01)
(52) U.S. Cl. ........................................ 333/254; 285/363
(58) Field of Classification Search .................. 333/254, 333/239, 248, 255, 256, 257; 285/48, 351, 285/352, 363, 364, 365, 368
See application file for complete search history.

(56) References Cited

U.S. PATENT DOCUMENTS

| | | | | |
|---|---|---|---|---|
| 3,500,264 A | * | 3/1970 | Floyd, Jr. | 333/254 |
| 6,448,875 B1 | * | 9/2002 | Sciarrino | 333/254 |
| 7,592,887 B2 | * | 9/2009 | Chao et al. | 333/254 |

FOREIGN PATENT DOCUMENTS

| | | |
|---|---|---|
| JP | 58-135587 A | 9/1983 |
| JP | 61-112191 A | 7/1986 |
| JP | 1-91301 A | 6/1989 |
| JP | 6-53888 A | 7/1994 |

OTHER PUBLICATIONS

International Search Report for PCT/JP2008/071586 mailed Jan. 27, 2009.

* cited by examiner

*Primary Examiner* — Stephen Jones

(57) ABSTRACT

An electrolytic corrosion prevention structure at a flange connection part in which the occurrence of an electrolytic corrosion is suppressed without increasing the number of the airtight and/or watertight parts and that can be easily processed is provided.
a pair of pipe members 21 and 22, which has flanges 21a and 22a at the end of pipes and which has a groove surrounding the end of the pipe formed between the flanges 21a and 22a by jointing the flanges 21a and 22a; an annular seal member 23 which places in an outer circumference of the joint part of the flanges 21 a and 22a in the groove: and an interposition member 24 which places in an outer circumference of the seal member 23; wherein the electric potential difference which occurs when either material of the pair of pipe members 21 and 22 and the material of the interposition member 24 are contacted, smaller than the electric potential difference when the materials of the pair of pipe member 21 and 22 are contact with each other.

9 Claims, 6 Drawing Sheets

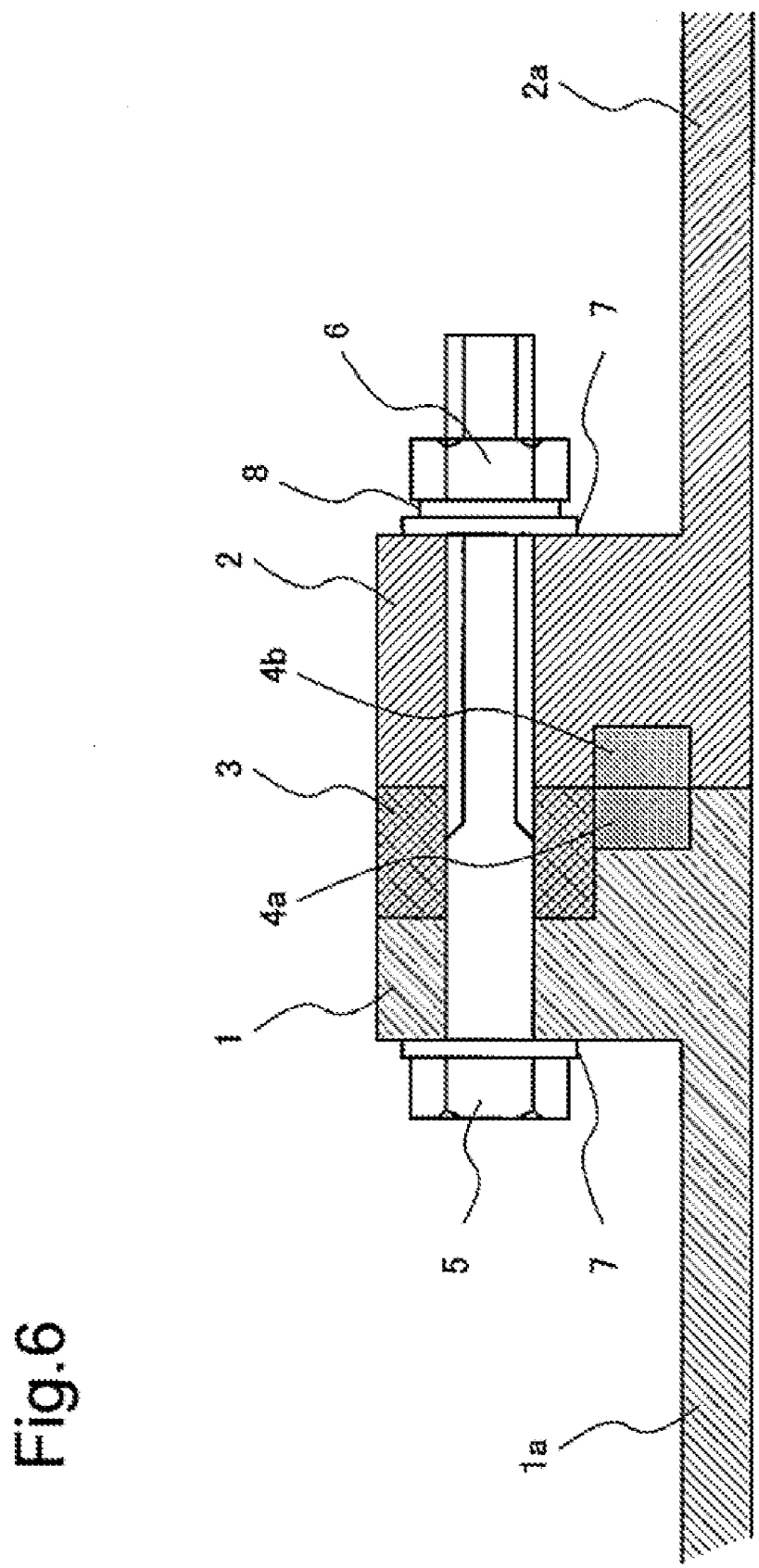

ELECTROLYTIC CORROSION PREVENTION STRUCTURE AND WAVEGUIDE CONNECTION STRUCTURE

This application is the National Phase of PCT/JP2008/071586, filed Nov. 27, 2008, which claims priority of Japanese Patent Application No. 2007-321335 filed Dec. 12, 2007, the contents of which are hereby incorporated by reference in their entirety as if fully set forth within.

TECHNICAL FIELD

The present invention relates to an electrolytic corrosion prevention structure in the connecting lace of a flange, and more particularly relates to an electrolytic corrosion prevention structure and a waveguide connection structure that suppress thickness in the connecting section.

BACKGROUND ART

For waveguides of outdoor type, when moist air or water penetrates in a waveguide from the connecting face of a flange, there is a possibility of the waveguide to corrode.

For this reason, airtight and/or watertight structure with a gasket and the like is used in every connecting face of a flange, in order to prevent the humidity or moisture to penetrate in a waveguide.

When waveguides of outdoor type are being placed, it is ideal to unify the materials of the waveguides, however in reality, waveguides formed in heterogeneous metals may have to be connected to each other.

When connecting together the heterogeneous metal waveguides, because the heterogeneous metals are connected to each other in a section outer side of a gasket of a connecting face of a flange, if humidity or moisture is supplied thereto, an electrolytic corrosion occurs due to a formation of a local cell, and an anode metal will corrode.

The greater the redox potential difference between the heterogeneous metal is (in other words, the greater the difference of the ionization tendency is), the quicker an electrolytic corrosion progresses, therefore when connecting waveguides of heterogeneous metals, a method of by inserting a metal having the intermediate electric potential of the metal thereof and having the redox potential difference low in a flange section of each waveguide is being used.

For example, when connecting aluminum alloy waveguide and copper alloy waveguide, the structure of inserting stainless alloy flange, which has the intermediate electric potential, between each flange section is used in order to prevent an electrolytic corrosion due to the potential difference.

However, the material itself of a stainless alloy is expensive compared to aluminum alloy and copper alloy and the like, as well as the processing cost because the processing is difficult. For this reason, the production cost of metal parts made from stainless alloy becomes high. In particular, when a gasket is attached on both sides of a flange, in addition to make the flange section thick according to the depth of the groove necessary for the attachment of a gasket, the production cost becomes high in order to process a groove on both sides of a flange.

Figure 1:
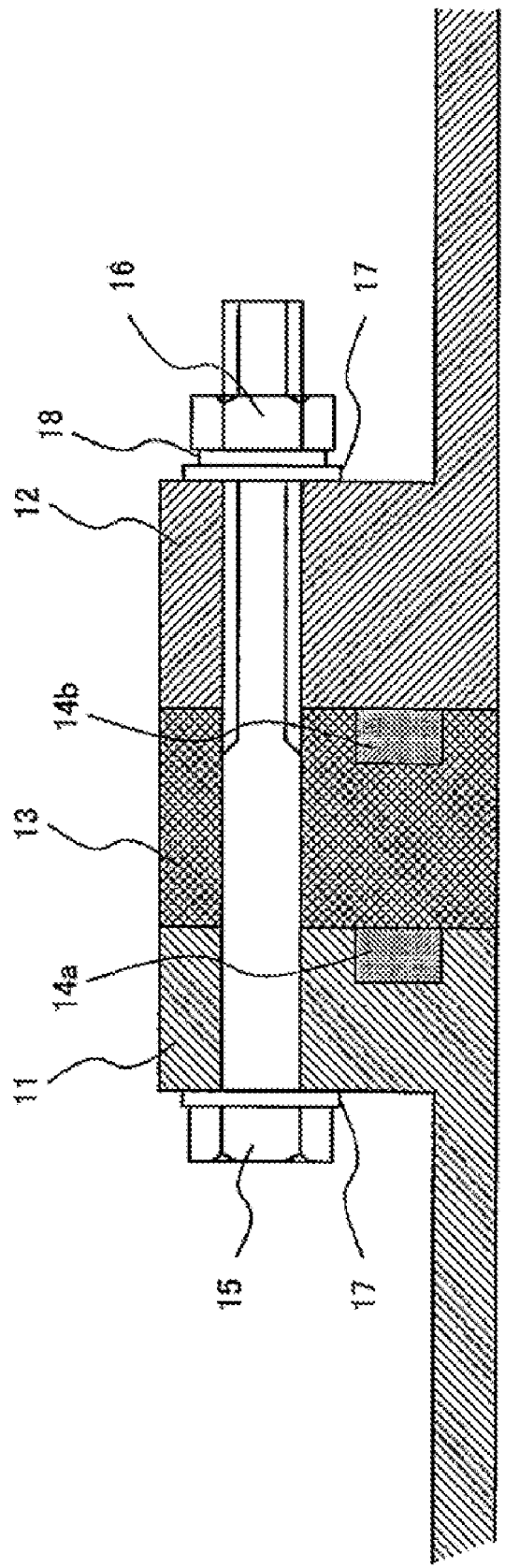
Figure 2:
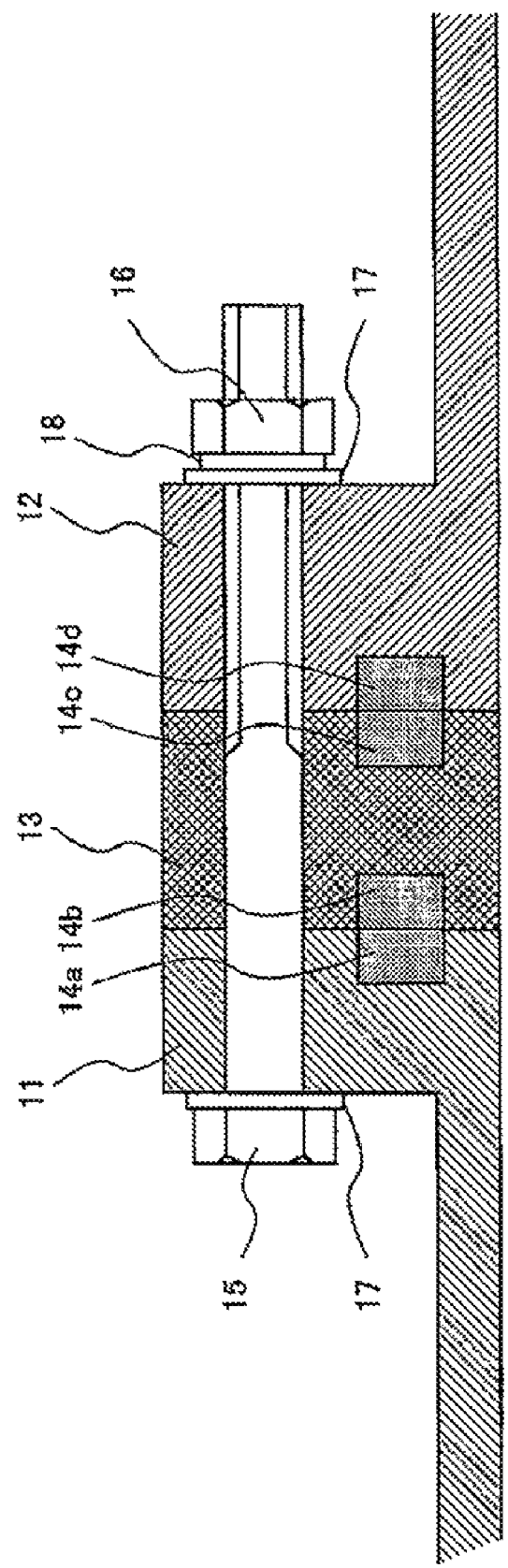

Furthermore, the number of the connection face of a waveguide flange will increase, and as shown in FIG. 1 or FIG. 2, there will be more parts to be airtight and/or watertight by using a gasket and the like.

The art related to the structure of connecting a tubular member as suppressing the occurrence of an electrolytic corrosion is disclosed in patent document 1 as "insulation flange". The patent document 1 is for ensuring the airtightness and/or watertightness of a pipe as preventing an electrolytic corrosion, by having an insulator impressed with an annular groove between a pair of flange placed, and by having a packing for sealing on the annular groove.

Patent document 1: Laid-Open Japanese Utility Model Publication No. Sho 61-112191

DISCLOSURE OF THE INVENTION

Problems to be Resolved by the Invention

The patent document 1 places an insulator instead of a metal of the intermediate electric potential between the flanges because it is an invention related to a flange of a gas pipe. However there are no differences to the configuration shown in FIG. 1 or FIG. 2 to fabricate airtight and/or watertight structure and there is a need to seal up both sides of the insulator. More specifically, by the invention disclosed in patent document 1, although the occurrence of an electrolytic corrosion can be suppressed, the problem of the number of airtight and/or watertight parts increasing will not be resolved.

Thus, an electrolytic corrosion prevention structure of a flange connecting part that can suppress the occurrence of an electrolytic corrosion without increasing the number of the airtight and/or watertight parts and can be easily processed, was not provided.

The present invention therefore has been made in consideration of the related problem, and it is an object of the invention to provide an electrolytic corrosion prevention structure and waveguide connection structure at a flange connection part in which the occurrence of an electrolytic corrosion is suppressed without increasing the number of the airtight and/or watertight parts and that can be easily processed.

Means of Solving the Problems

In order to achieve the above object, as a first embodiment, the present invention is an electrolytic corrosion prevention structure having a pair of pipe members having flanges at the end of pipes and by jointing the flanges having a groove surrounding the end of the pipe formed between the flanges, an annular seal member placed in an outer circumference of the joint part of the flanges in the groove, and an interposition member placed in an outer circumference of the seal member; and provides an electrolytic corrosion prevention structure characterized in having the electric potential difference which occurs when having either material of the pair of pipe members and the material of the interposition member in contact, smaller than the electric potential difference when having the materials of the pair of pipe member in contact with each other.

Furthermore, in order to achieve the above object, as a second embodiment, the present invention is a waveguide connection structure applied with the electrolytic corrosion prevention structure related to the above first embodiment of the present invention, and provides a waveguide connection structure characterized in that a pair of pipe members is a waveguide.

THE ADVANTAGEOUS EFFECT OF THE INVENTION

According to the present invention, the occurrence of an electrolytic corrosion can be suppressed without increasing the number of the airtight and/or watertight parts, and an electrolytic corrosion prevention structure and a waveguide connection structure at a flange connection part that is easily processed can be provided.

BEST MODE FOR CARRYING OUT THE INVENTION

Figure 3:
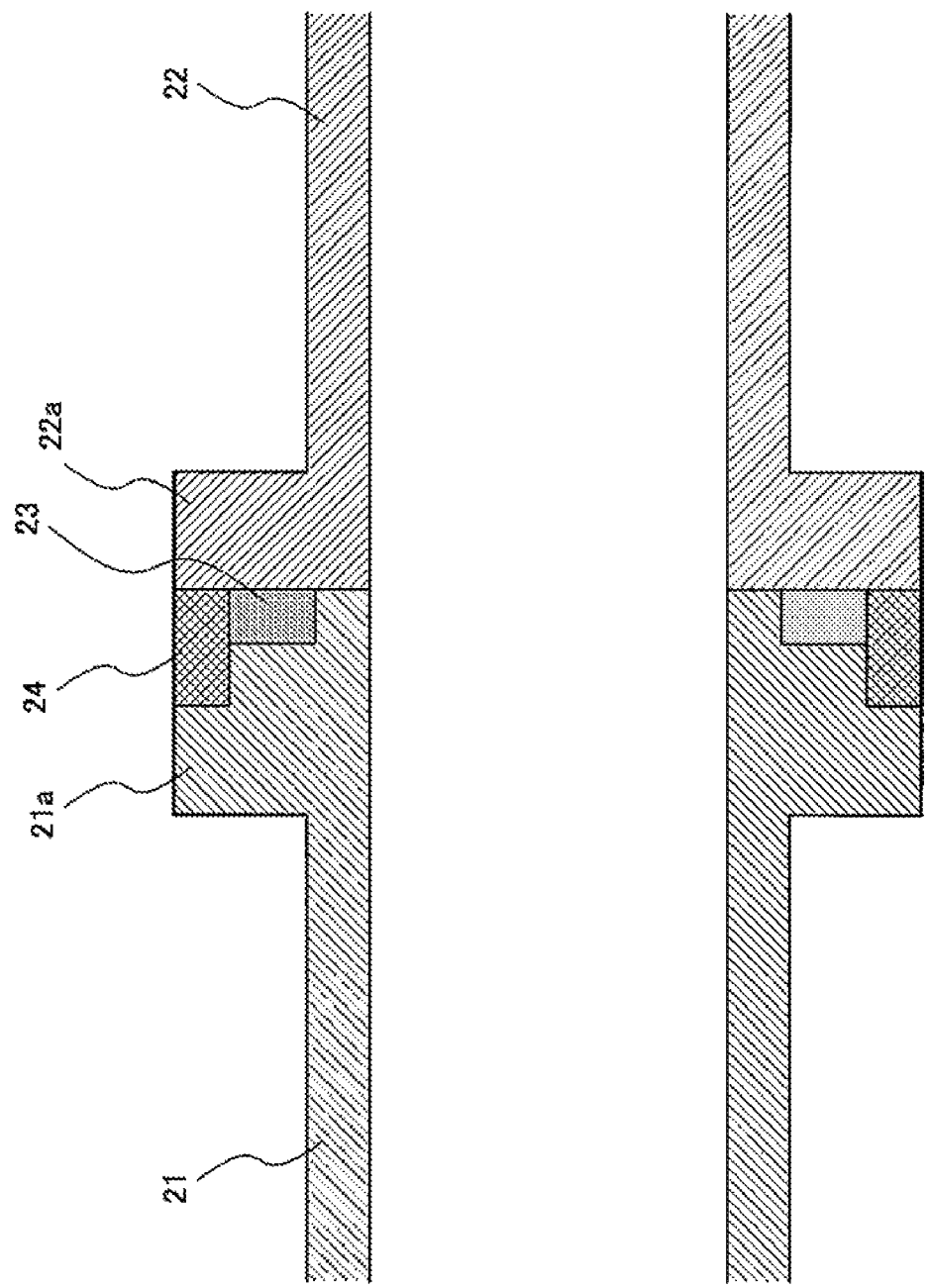

As shown in FIG. 3, the electrolytic corrosion prevention structure related to the present invention having pipe members 21 and 22 having flanges 21a and 22a at the end and by jointing flanges 21a and 22a having a groove surrounding the end of the pipe formed between flanges 21a and 22a, an annular seal member 23 placed in an outer circumference of the joint part of the flanges in the groove, and an interposition member 24 placed in an outer circumference of the seal member 23, is characterized in having the electric potential difference which occurs when having either material of the pipe members and the material of interposition member 24 in contact, smaller than the electric potential difference when having the material of pipe member 21 or 22 in contact with each other.

Hereinafter, preferred embodiments of the present invention will be described when having an example of the above mentioned electrolytic prevention structure applied to as a waveguide connection structure.

[The First Embodiment]

Figure 4:
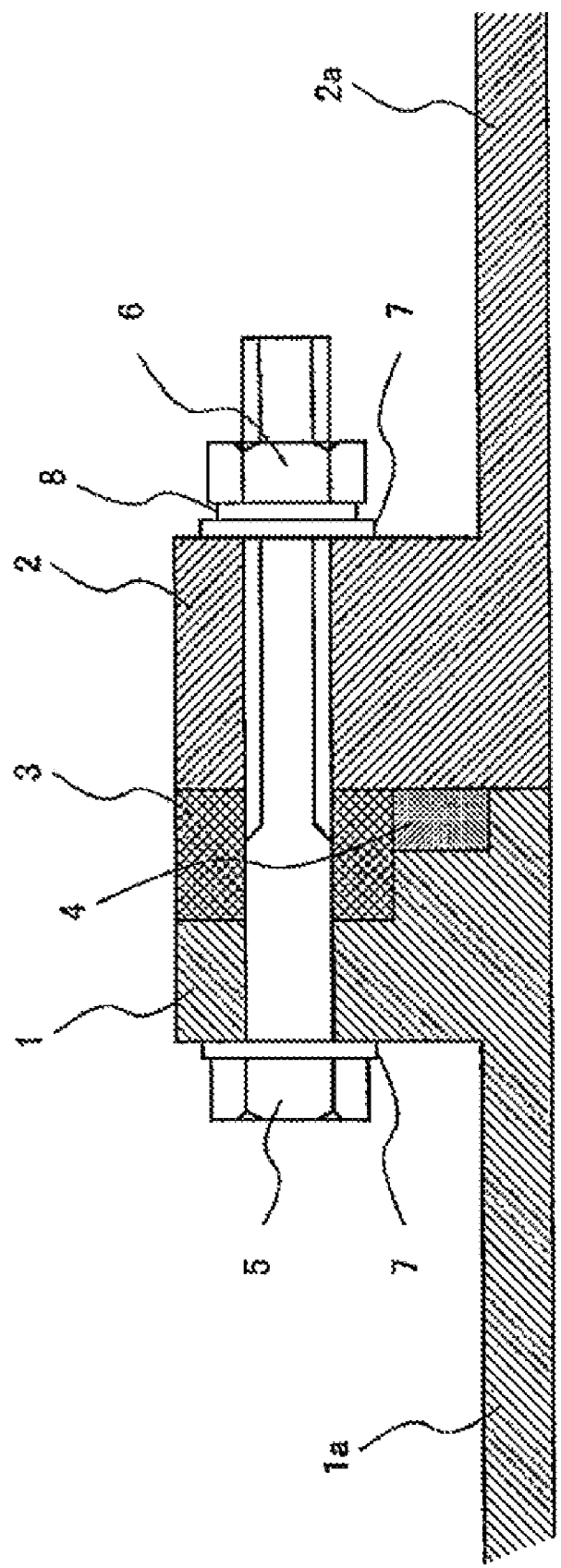
Figure 5:
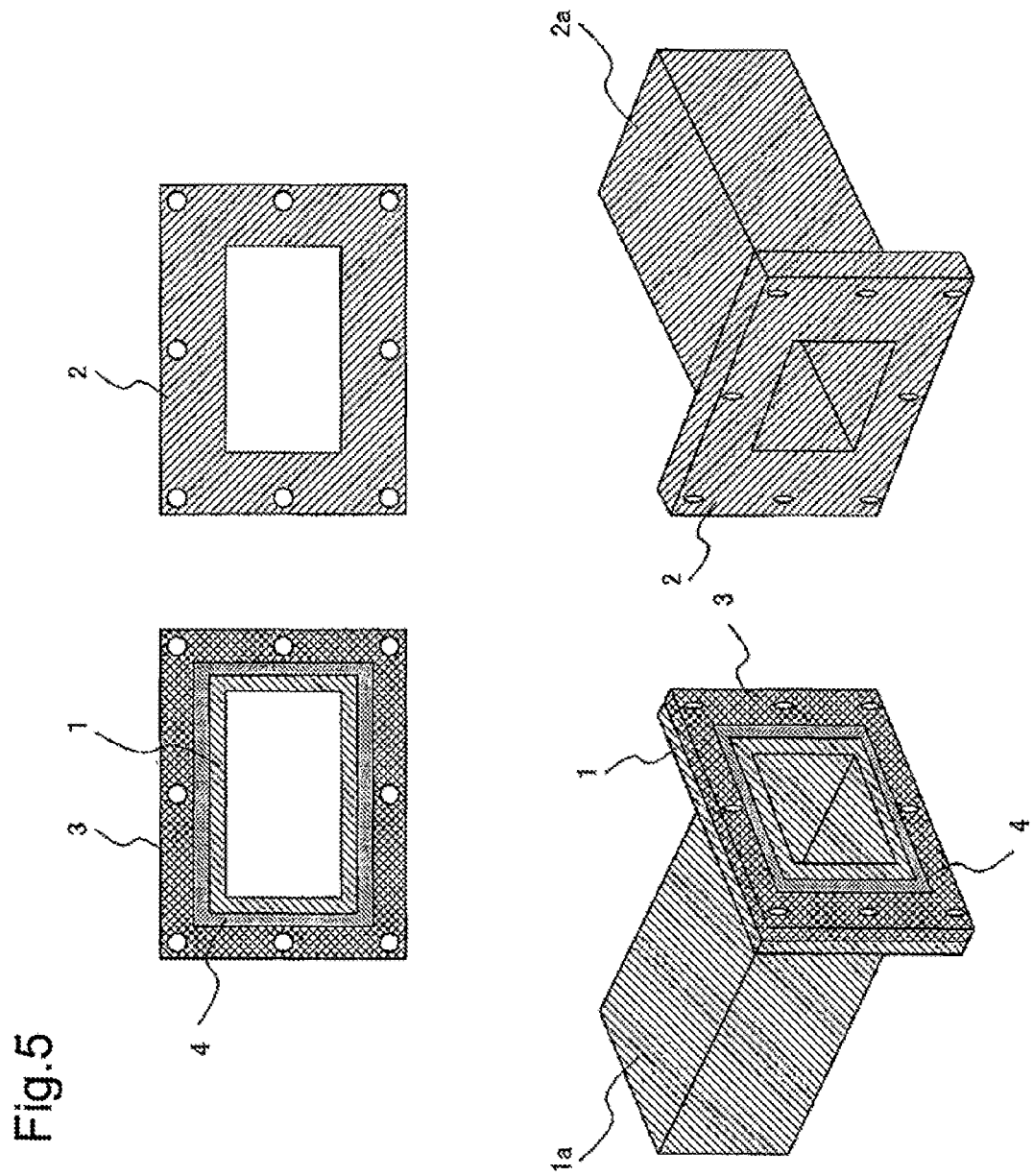

A first preferred embodiment of the present embodiment will be described. In FIG. 4 and FIG. 5, an electrolytic corrosion prevention structure of a flange part related to the first embodiment is shown. The electrolytic corrosion prevention structure has a first waveguide flange 1, a second waveguide flange 2, a third waveguide flange 3, a gasket 4, a screw 5, a nut 6, a washer 7, and a spring washer 8. In addition, the first waveguide flange 1 and the second waveguide flange 2 corresponds to pipe members 21 and 22 in FIG. 3 respectively. Furthermore, the third waveguide flange 3 corresponds to an interposition member 24 in FIG. 1. Moreover, gasket 4 corresponds to a seal member 23.

The first waveguide flange 1 and the second waveguide flange 2 are formed in metal materials that has a different redox potential. For example, it is a combination of one as aluminum alloy and the other as copper alloy, combination of aluminum alloy and nickel alloy, combination of aluminum alloy and titanium alloy, and combination of aluminum alloy and nickel alloy, and the like.

In addition, the third waveguide flange 3 is formed in a material having an intermediate redox potential of the redox potential of the material of the first waveguide flange 1 and the redok potential of the material of the second waveguide flange. For example, when one of the first waveguide flange 1 and the second waveguide flange 2 is aluminum alloy and the other is copper alloy, it is formed in stainless alloy and the like.

While the first waveguide flange 1 and the second waveguide flange 2 are formed in one with waveguides 1a and 2a respectively, the third waveguide flange 3 is formed in a circular pattern and is independent from either waveguides.

To the first waveguide flange 1, the second waveguide flange 2, and the third waveguide flange 3, a through hole is formed, and screw 5 is inserted to the through hole via washer 7. To screw 5, nut 6 is fastened via washer 7 and spring washer 8. By fastening nut 6, the distance of the head of screw 5 and nut 6 is narrowed, gasket 4 between the first waveguide flange 1 and the second waveguide flange 2 is closely-attached to the head of screw 5 and nut 6.

The first waveguide flange 1 and the second waveguide flange 2 contact each other at the inner circumference by jointing each other, and formed into a shape that the predetermined distance exists at the outer circumference, more specifically, formed into a shape where a groove is formed at the part joined. The gap is almost the same form of the third waveguide flange, and when the first waveguide flange 1 and the second waveguide flange 2 having the third waveguide flange 3 in between are joint together, there has never been almost any gap in either between the first waveguide flange 1 and the third waveguide flange 3, or between the second waveguide flange 2 and the third waveguide flange 3.

Gasket 4 is placed at a part that touches the bottom of a groove formed by the first waveguide flange 1 and the second waveguide flange 2 (the joint part of the first waveguide flange 1 and the second waveguide flange 2). Gasket 4 is closely-attached to the first waveguide flange 1 and the second waveguide flange 2 respectively, and airtights and/or watertights an outer circumferential part thereof.

When the first waveguide flange 1 and the third waveguide flange 3 is combined, a concave portion is formed in the outer circumference of the joint part of the first waveguide flange 1 and the second waveguide flange 2 is joint, and gasket 4 will be in a state seated within the concave portion.

At the outer circumferential part of gasket 4, the third waveguide flange 3 interposes between the first; waveguide flange 1 and the second waveguide flange 2, and the first waveguide flange 1 and the second waveguide flange 2 is not in direct contact. For this reason, the first waveguide flange 1 and the second waveguide flange 3 do not form a local cell, therefore electrolytic corrosion will not occur even if humidity or moisture enter into the gap between the flanges.

In addition, in the inner circumferential part of gasket 4, the first waveguide flange 1 and the second waveguide flange 2 contact directly, however the part is kept airtight and/or watertight by gasket 4, therefore humidity or moisture contained in the outside air is not supplied. As a result, even if the first waveguide flange 1 and the second waveguide flange 2 contacts directly, electrolytic corrosion will not occur at the part.

As described above, airtightness and/or watertightness and electrolytic corrosion prevention can be obtained in the electrolytic corrosion prevention structure related to the present embodiment by making one part of the outer circumferential of the joint of the first waveguide flange 1 and the second waveguide flange 2 airtight and/or watertight. As a result, occurrence of electrolytic corrosion can be suppressed without increasing the number of airtight and/or watertight part. Furthermore, because a gasket is seated within the concave portion formed by the first waveguide flange and the third waveguide flange, there is no need to apply a complicated processing to the flanges.

In addition, although a metal material is used for the third waveguide flange in the present invention, nonconductive materials such as ceramics may form the third waveguide flange.

[The Second Embodiment]

A second preferred embodiment of the present embodiment will be described. In FIG. 6, an electrolytic corrosion prevention structure of the flange part related to the present embodiment is shown. Although the structure is almost the same as in the first embodiment, a concave portion 2a is placed at the joint face of a second waveguide flange 2, and a gasket 4b is placed thereon. Gasket 4b is in contact with a gasket 4a. More specifically, concave portion 2a is formed as facing a concave portion that is formed by a first waveguide flange 1 and a third waveguide flange 3.

In the present embodiment, as in the first embodiment, electrolytic corrosion prevention performance and the airtightness and/or watertightness of the waveguide section can be obtained.

Further, each foregoing description of the preferred embodiment of the present invention have been presented by way of example only, and not limitation.

For example, in each foregoing preferred embodiment, a configuration obtaining airtightness and/or watertightness using a gasket is described as an example, however airtightness and/or watertightness may be obtained by using adhesive materials or caulking materials instead of a gasket.

Furthermore, in each foregoing preferred embodiment, the configuration of having the flanges in pressure bonding by fastening a nut to a screw that has a flange passed through is described, however pressure bonding may be obtained by inserting a flange with a vise and the like.

As described above, various modifications is possible by the present, invention.

BRIEF DESCRIPTIONS OF THE DRAWINGS

FIG. 1 is conventional waveguide connection structure.
FIG. 2 is conventional waveguide connection structure.
FIG. 3 is the electrolytic corrosion prevention structure related to the present invention.
FIG. 4 is the waveguide connection structure related to the first embodiment of the present invention.
FIG. 5 is the form of a flange of the waveguide connection structure related to the first embodiment.
FIG. 6 is the waveguide connection structure related to the second embodiment of the present invention.

DESCRIPTION OF THE CODES 1, 11 the first waveguide flange
1a, 2a waveguide
2, 12 the second waveguide flange
3, 13 the third waveguide flange
4, 14 gasket
5, 15 screw
6, 16 nut
7, 17 washer
8, 18 spring washer

The invention claimed is:

1. An electrolytic corrosion prevention structure, comprising:
   a pair of pipe members which has flanges at the end of pipes and which has a groove surrounding the end of the pipe formed between the flanges by jointing the flanges;
   a seal member which places in an outer circumference of the joint part of the flanges in the groove;
   an interposition member which places on the part of outer circumference of the seal member of the groove; and
   a co-fastening member which has the seal member closely-attached to each of the flanges of the pair of pipe members by fastening each of the flanges to the interposition member; wherein
   the electric potential difference which occurs when either of the pipe members and the interposition member come in contact is smaller than the electric potential difference which occurs when the pair of pipe members comes in contact with each other.

2. An electrolytic corrosion prevention structure according to claim 1, wherein each of the pair of pipe members is formed in metal material having a different redox potential, and the interposition member is formed in a material having an intermediate redox potential of each of the pair of pipe members.

3. An electrolytic corrosion prevention structure according to claim 1, wherein the interposition member is formed in nonconductive material.

4. An electrolytic corrosion prevention structure according to claim 1, wherein the seal member is placed in the surrounding space by each of the pair of pipe members and the interposition member.

5. An electrolytic corrosion prevention structure according to claim 1, wherein the seal member is formed in a material having the modulus of volume elasticity and isolating the joint part of the flanges from the outer air by closely-attached to both pair of flanges.

6. An electrolytic corrosion prevention structure according to claim 1, wherein the seal member is placed in a concave portion formed by the flange of one of the pair of pipe members and the interposition member.

7. An electrolytic corrosion prevention structure according to claim 1, wherein the seal member is placed in both a first concave portion formed by the flange of one of the pair of pipe members and the interposition member, and a second concave portion is formed by the flange of the other of the pair of pipe members.

8. A waveguide connection structure having an electrolytic prevention structure, comprising:
   the electrolytic prevention structure according to claim 1, a waveguide connection structure, wherein
   the pair of pipe members is a waveguide.

9. An electrolytic corrosion prevention structure according to claim 1, wherein the co-fastening member further includes a screw bolt and a nut.

* * * * *